(No Model.)

N. LOMBARD.
AUTOMATIC CUT-OFF.

No. 535,952. Patented Mar. 19, 1895.

Witnesses.
John F. Nelson.
Francis C. Stanwood.

Inventor.
Nathaniel Lombard.
by H. L. Lodge Atty.

UNITED STATES PATENT OFFICE.

NATHANIEL LOMBARD, OF BOSTON, MASSACHUSETTS, ASSIGNOR TO THE LOMBARD HYDRAULIC BRAKE COMPANY, OF SAME PLACE AND PORTLAND, MAINE.

AUTOMATIC CUT-OFF.

SPECIFICATION forming part of Letters Patent No. 535,952, dated March 19, 1895.

Application filed September 28, 1894. Serial No. 524,340. (No model.)

*To all whom it may concern:*

Be it known that I, NATHANIEL LOMBARD, a citizen of the United States, residing at Boston, in the county of Suffolk and State of Massachusetts, have invented certain new and useful Improvements in Automatic Cut-Offs; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to mechanism adapted to operate a valve and acts to control the valve and maintain it in a normally closed position thus serving as a cut-off.

This invention is especially adapted to cooperate with and be applied to an invention, described under Letters Patent of the United States No. 523,436 issued in my name on the 24th day of July, 1894. In this invention the movement of a piston within a cylinder was designed to set brake mechanism, and such movement of the piston was effected by the flow of liquid through a valve; but in the proper operation of this system, it was necessary to open the valve for a certain period to produce the required brake effect, and then to close the valve, otherwise the travel of the piston would continue and the brake effect become excessive; but to produce automatic closing of the valve immediately after it has been opened, and thus enable the operator to merely open the valve to obtain a certain desired result, and further that he shall be assured that the valve will be closed in order to prevent further continuance of the result of an open valve is the object of my invention.

Figure 1:
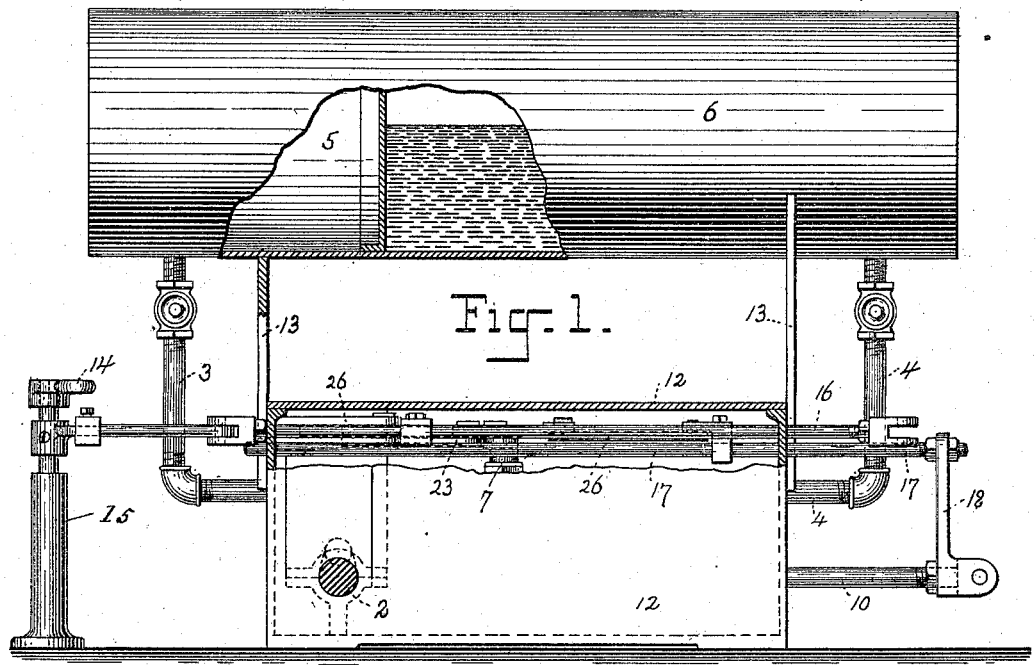
Figure 2:
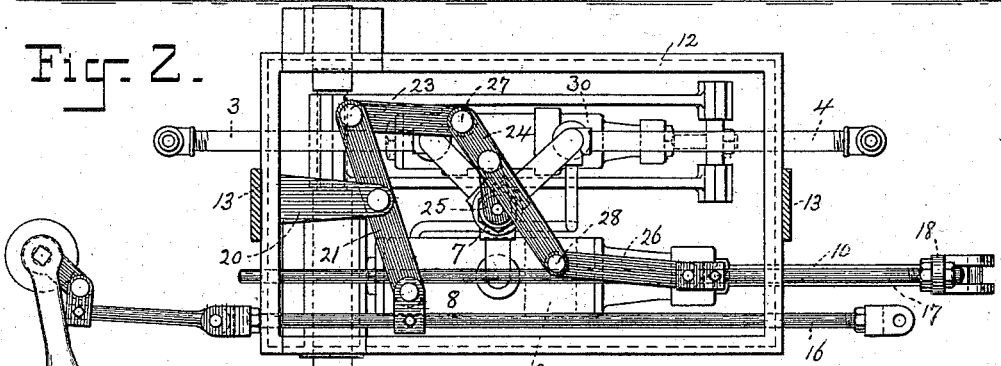
Figures 3, 4:
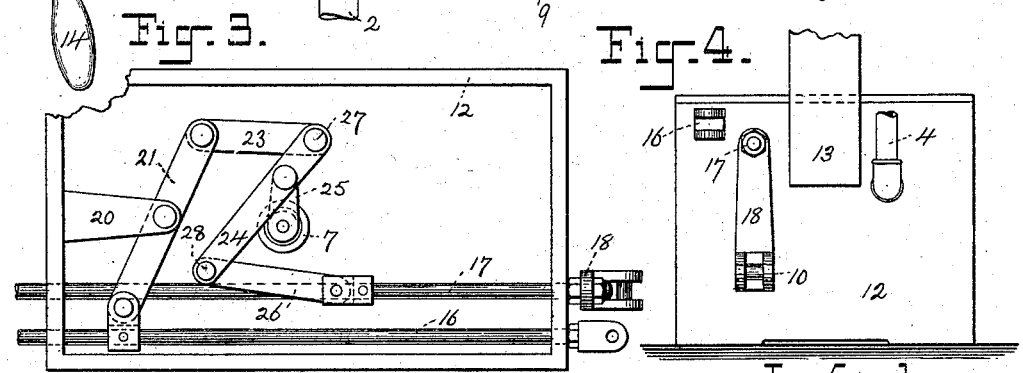

The drawings represent in Figure 1 a sectional side elevation of valve-controlling mechanism embodying my invention. Fig. 2 is a plan of the same. Fig. 3 is a plan showing the parts in the opposite extreme to that in Fig. 2. Fig. 4 is an end view of the apparatus.

In the drawings I have represented my invention applied to a closed system for operating brakes after the manner described in my invention under Letters Patent No. 523,436 and which includes a rotary shaft 2, for a liquid forcing device 30. From the latter extend pipes 3, 4 to closed reservoirs 5, 6, respectively for vacuum and pressure service. Furthermore a three-way valve 7 is designed to connect either of the vessels 5, 6 with a cylinder 8, or the valve may perform the further duty and serve to place the liquid-forcing device in communication with said vacuum and pressure reservoirs.

The cylinder 8 is termed the brake cylinder, since it contains a piston 9 equipped with a rod 10 adapted to connect with the brake beam (not shown). These several parts above mentioned are contained within a closed box or receptacle 12 furnished with supports 13 on which rests the reservoirs 5, 6.

In the active operation of this mechanism, a handle or throttle lever 14 is to be mounted in any desired position for the control of the brakes, or other contrivance, in the present instance for purposes of illustration upon a post 15. Said throttle lever is then connected in any manner with an actuating rod 16, equipped at both extremities with couplings in order that the throttle lever may be attached at either end. This rod 16 is arranged to reciprocate and is intended in connection with other elements to open the valve 7, while a similarly disposed valve rod 17, arranged to reciprocate oppositely and to close the valve is united by a cross-bar 18 with the piston rod 10. Thus it will be understood that a slight impulse or motion of the rod 16 by means of the throttle lever in order to open the valve is immediately attended by a counter effect upon the valve rod 17 through the agency of the piston travel—that is, the act of opening the valve has caused the piston to advance a certain distance within the cylinder, but this advance of the piston actuates the valve rod 17 an equal amount, since the two are interconnected, and imparts sufficient motion to a group of levers to cause closing of the valve 7. Therefore the same impulse, which opened the valve in order to advance the piston, at the same time by the motion of said piston has actuated certain other parts to close the valve. In this manner it will be seen that the operator is merely required to move the throttle lever 14 always in the same direction a greater or less extent to set the brakes more or less hard. To release the brakes opposite movement is imparted to the throttle lever. The group of levers which control the valve are so arranged that a small motion of the handle 14 is multiplied. Hence this latter element is not thrown to its full extent at any time, except when the valve is to be opened wide in an emergency, or when the brakes are to be set hard instantly. Thus it will be understood that every time the throttle lever 14 is operated, movement of the piston is produced and this movement is at once checked by closing of the actuating valve. In this way successive brake action is produced and the disadvantages, which would otherwise occur under this system due to the use of a valve are entirely overcome. Ordinarily, if the valve was opened the piston would continue to advance, thereby constantly increasing the brake action. Very often this is not desired, but under my improvements the throttle lever 14 may be operated and the brakes are set a certain amount, and this action is now a constant. If the brakes are to be set still harder the use of the throttle lever is repeated, or it may be moved a greater distance, if the brakes are to be set hard. To obtain this peculiar result, as above described, the main actuating rod 16, the valve rod 17 and the valve stem or arm 25 are interconnected by a system of levers, as follows: An inwardly projecting bracket 20 supports a rocking lever 21, which is fast to the rod 16. The opposite end of this lever 21 is pivotally connected to a link 23. Furthermore an oscillating lever 24 is pivotally secured to the free end of an arm 25 firmly fastened on the valve stem; while the opposite extremities of said lever 24 are united respectively to one end of the link 23 and the movable end portion of a connecting rod 26, which is rigidly attached to the valve rod 17 actuated by the piston, as before described.

In the active operation of the brakes it will be perceived that the pivots 27, 28 alternately become fixed points. Thus to instance the act of setting the brakes it is to be understood that the piston 9, piston rod 10, valve rod 17, and connecting rod 26 are fixtures. Hence when the throttle lever 14 is moved the rod 16, lever 21, link 23, and lever 24 are rocked to shift the valve, and open it, the pivot 28 being a fixed point. Immediately upon this act this last group of parts become stationary, while the first group move, at which time the pivot 27 is a fixed point and the valve is closed. Further brake action is thus prevented, but that produced now remains a constant until the throttle lever 14 is again actuated either to still further set the brakes or release them in part or entirely.

In the operation of this apparatus it may be observed that the movement of the valve to admit more or less liquid within the cylinder, and a corresponding proportional travel of the piston, will cause greater or less brake action, and as the valve by means of my cut-off is instantly thereafter closed, the resultant effects are an intermittent movement of the piston. The action of this apparatus in its operation is analogous to that produced by the winding on of a chain about a drum, except that the brake effect is more powerful and positive owing to the fact that very high pressure may be exerted upon the piston. It is to be understood that a small opening of the valve does not necessarily cause the piston to travel the entire length of the cylinder although it is within the capabilities of the apparatus should an emergency call for such a powerful application of the brakes.

As shown in Fig. 2 of the drawings, the parts are in position to have the valve open in order to unite the cylinder with the pressure reservoir 6; but the same general movements occur in order to interconnect the cylinder with the vacuum vessel 5 only greater movement of the throttle lever is necessary in order to shift the valve into such a position that the cylinder can exhaust into the vacuum reservoir and thereby release the brakes.

What I claim is—

1. The combination with a piston-equipped cylinder, a valve therefor, a valve rod, and an actuating rod, of an oscillating bar adapted to control the valve, and a series of levers arranged to interconnect the bar respectively with the valve rod and the actuating rod, whereby the opposite ends of the said bar alternately become fixed fulcrum points, substantially as specified.

2. The combination with an actuating rod operated manually, a piston rod, and a valve-rod moving in unison therewith, of a valve which controls the movements of the piston rod, an oscillating bar 24 to control the valve, and mechanism adapted to interconnect the opposite ends of said bar respectively with the actuating rod and with the valve rod to alternately open and close the valve, substantially as and for purposes explained.

3. In combination with a cylinder, a piston therefor, a valve to control the travel of the piston, and a valve rod moving in unison with the piston, an actuating rod, a series of levers, and an oscillating bar 24 which unites said actuating rod and levers with the valves and the valve rod, whereby the end of the bar affixed to the valve-rod may become a fixed point, while the levers, actuating rod, and bar 24 are operating to open the valve, substantially as described.

4. The combination with a piston-equipped cylinder, a piston rod, and a valve rod moving in unison therewith, of a valve which controls the piston, an actuating rod adapted to reciprocate oppositely of the valve rod, and a group of levers comprising the rocking bars 21, 24, link 23, a connecting rod 26 and a crank fast on the valve stem, said crank being pivotally attached to the bar 24, all operating, substantially as stated.

In testimony whereof I affix my signature in presence of two witnesses.

NATHANIEL LOMBARD.

Witnesses:
H. E. LODGE,
FRANCIS C. STANWOOD.